United States Patent [19]

Masaki

[11] Patent Number: 4,541,967

[45] Date of Patent: Sep. 17, 1985

[54] PACKING FOR PACKED TOWERS FOR INTER-FLUID CONTACT

[75] Inventor: Hideyuki Masaki, Hashima, Japan

[73] Assignee: NGK Insulators, Ltd., Japan

[21] Appl. No.: 557,003

[22] Filed: Dec. 1, 1983

[30] Foreign Application Priority Data

Dec. 8, 1982 [JP] Japan .......................... 57-185458[U]

[51] Int. Cl.[4] ................................................ B01F 3/04
[52] U.S. Cl. .......................................... 261/95; 55/90; 55/233; 202/158; 261/DIG. 72
[58] Field of Search .................................... 261/94–98, 261/111, 112, DIG. 11, DIG. 72; 202/158; 210/150; 55/90, 233

[56] References Cited

U.S. PATENT DOCUMENTS

| | | | |
|---|---|---|---|
| 1,887,704 | 11/1932 | Wilisch | 261/DIG. 72 |
| 2,376,349 | 5/1945 | Frischer | 261/DIG. 72 |
| 2,739,118 | 3/1956 | Carey | 261/DIG. 72 |
| 2,906,512 | 9/1959 | Meek | 261/DIG. 72 |
| 3,502,596 | 3/1970 | Sowards | 261/DIG. 72 |
| 3,506,248 | 4/1970 | Starbuck et al. | 261/DIG. 72 |
| 3,523,681 | 8/1970 | Jaye | 261/DIG. 72 |
| 4,487,727 | 12/1984 | Ballato, Jr. | 261/94 |

FOREIGN PATENT DOCUMENTS

| | | | |
|---|---|---|---|
| 1479656 | 7/1977 | United Kingdom | 261/DIG. 72 |
| 712116 | 1/1980 | U.S.S.R. | 261/DIG. 72 |

Primary Examiner—Richard L. Chiesa
Attorney, Agent, or Firm—Parkhurst & Oliff

[57] ABSTRACT

A packing material for a packed tower through which fluids to be processed are adapted to flow in contact with each other. The packing material comprises a packing block of honeycomb structure comprising partition walls defining a multiplicity of channels which are formed in parallel to each other as fluid passages through the packing block. The packing block includes plural plane sides in which said channels are open at opposite ends thereof. At least one of these plane sides is non-orthogonal or inclined to a line of extension of the channels. This at least one non-orthogonal plane side may have a larger surface area than the rest of the plane sides of the packing block. The packing block is preferably a polyhedron having not less than eight planes sides each as viewed in elevation, so that said channels are open in non-orthogonal relation with at least two of the plane sides of the polyhedron.

5 Claims, 7 Drawing Figures

U.S. Patent    Sep. 17, 1985    4,541,967
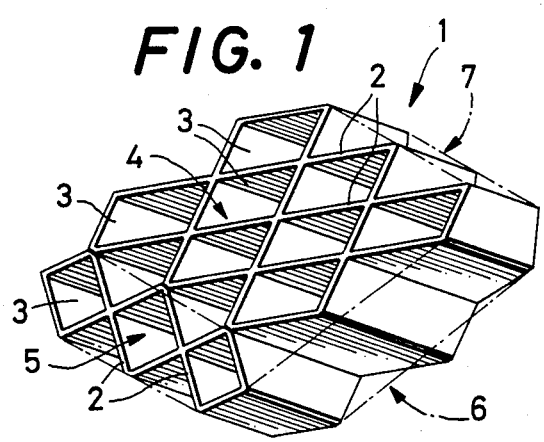
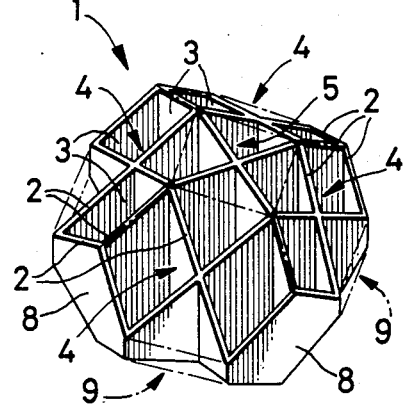
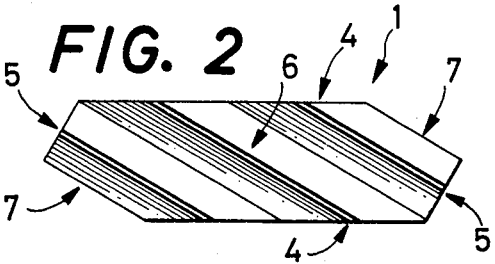
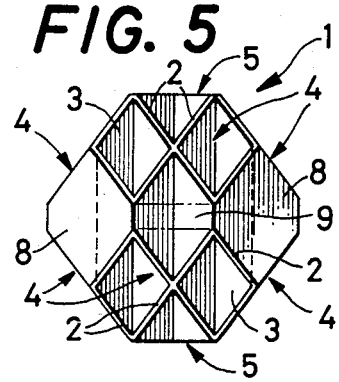
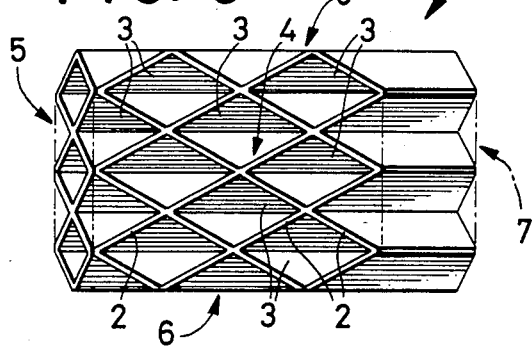
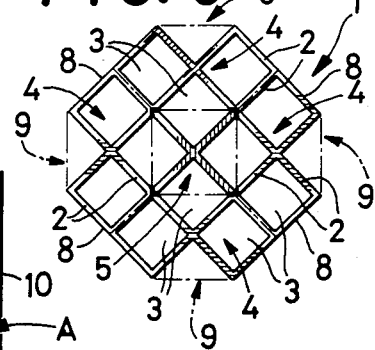
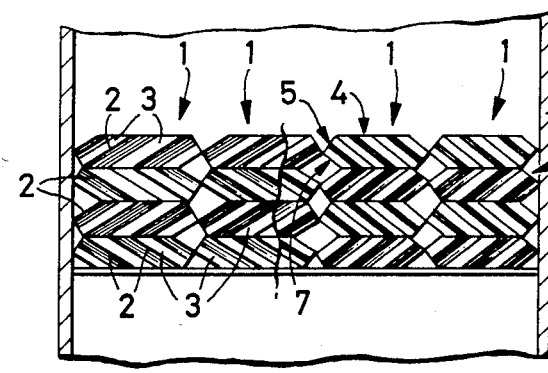

PACKING FOR PACKED TOWERS FOR INTER-FLUID CONTACT

BACKGROUND OF THE INVENTION

The present invention relates in general to differential inter-fluid contact equipment to provide contact between gases, between liquids or between gas and liquid for various industrial purposes, such as packed towers for distillation, absorption, cooling and desorption (stripping). More particularly, the invention is concerned with a packing or packing material filling such packed towers.

In the art of inter-fluid contactors such as distillation, absorption, cooling and desorption towers or columns, various types of packings made of ceramics, glass, synthetic resin, or metal, are known as materials which fill the towers for higher efficiency of contact between different gases or liquids, or between gas(es) and liquid(s). Those packing materials which fill a packed tower are either dumped in random into a tower or stacked in order in the tower. In other words, the packings are arranged either in an irregular or dumped fashion in the form of pellets, or in cylindrical, planar or other forms, or in a regular or stacked fashion in the form of grids or honeycombs. Different kinds of fluids to be treated for contact with each other are adapted to flow through those irregularly or regularly arranged packings. It is a recognized requirement that the packings assure a minimum pressure loss or drop of the fluids during their flow through the tower, as well as provide an improved efficiency of contact between the flowing fluids.

A known advantage of the dumped packing materials of cylindrical or planar shapes or in the form of pellets, lies in that they are easily loaded into a tower, i.e., a random arrangement of the packing materials within the tower is sufficient for filling the tower with the packing. On the other hand, however, such random or dumped packing arrangement causes an operational problem which occurs, for example, when a gas-liquid contact is effected in a countercurrent manner, more specifically, in such a manner that liquid flows downward through the packing from the top of a tower while a gas flows upward through the packing from the bottom of the tower. In this instance, surfaces of the dumped packing material arranged in random cause complicated turbulent countercurrent flows of the fluids, thereby contributing to improvement in efficiency of gas-liquid contact. With the traditional dumped packings within the tower, however, some of the channels or passages formed in a bed or layer of the individual packings are oriented so that they extend almost normal or orthogonal with respect to the longitudinal axis of the packed tower, i.e., to the line of flow of the fluids through the tower, whereby there are considerable chances of the fluid streams colliding with or impinging upon the outer wall surfaces of the packings. This phenomenon not only creates a tendency of the liquid to stay around the wall surfaces of the packings, but also leads to an increase in pressure loss of the upwardly flowing gas due to collision thereof with the surfaces of the packings. The above stay of the liquid and pressure loss of the gas will increase difficulty of the fluids to pass through the channels formed in the packings, and consequently reduce the contact efficiency of the fluids to be treated. These have been the recognized drawbacks associated with the traditional dumped packings of irregular or random arrangement.

In the case where a packed tower is filled with regularly stacked packings of grid or honeycomb type, the fluid flow channels formed in the packings are generally oriented substantially in parallel to the line of flow of the fluids through the tower. As a result, the pressure loss encountered with this regular arrangement is less than that experienced when pellet-type packings or other dumped packings are used. However, the stacked packings suffer a decrease of collision between liquid and gas, which results in a local blow or channelling of the gas without contacting the liquid, thereby reducing the liquid-gas contact efficiency. A further inconvenience of these stacked packings arises from their inherent requirement that the individual packing bodies be placed in the tower with predetermined orientation, which increases the cost for filling the tower.

SUMMARY OF THE INVENTION

It is accordingly a main object of the present invention to provide a packing to fill a packed tower for inter-fluid contact, which has an improved structure.

Another object of the invention is to provide such packing which permits a reduced pressure loss of fluids flowing through the packed tower, and an increased efficiency of contact between the fluids.

According to the present invention, there is provided a packing material for a packed tower through which fluids to be processed are adapted to flow in contact with each other. The packing material consisting of a packing block of honeycomb structure including partition walls defining a multiplicity of channels which are formed in parallel to each other as fluid passages through the block. The packing block has plural plane sides or faces in which the channels are open at opposite ends thereof. At least one of said plane sides is non-orthogonal to a longitudinal line or line of extension of the channels, i.e., inclined at an angle with respect to the direction of flow of the fluids through the channels.

In operation, the packing block described above is used in a large number to form a bed or layer of the packing material which fill the packed tower. The channels formed through the individual blocks and voids formed between the blocks cooperate to constitute a complicated newtwork of fluid passages which produces turbulent flows of the fluids for improved efficiency of the inter-fluid contact, while at the same time the above indicated angled arrangement of the channels relative to the selected plane sides or faces of each block serves to minimize a pressure drop of the fluids due to collision of the fluids with the outer wall surfaces of the blocks.

In accordance with one preferred form of the packing material of the invention, the honeycomb packing block is adapted such that the non-orthogonal plane side or sides which is (are) not orthogonal to the channels has (have) a greater surface area than the rest of the plane sides provided on the honeycomb packing block. In this arrangement, the adjacently located blocks within the tower tend to be superposed one on another with the non-orthogonal side held in abutting contact with each other, and consequently an increased chance is provided for inclination of the channels relative to the line of flow of the fluids through the packed tower.

According to a further advantageous form of the packing material of the invention, the packing block is a polyhedron having not less than eight plane sides or faces each as viewed in elevation. More specifically, surfaces and edges of the packing block defining its external peripheral profile as viewed in elevation are disposed in respective planes of said not less than eight plane sides or faces of the polyhedron. In other words, the surfaces of the packing block in which the channels are open, and the planes including the outer surfaces and/or edges of the partition walls of the packing block, define the eight or more plane sides or faces of the above-indicated polyhedron. The channels are open at their opposite ends in an inclined relation, i.e. non-orthogonal relation with at least two of these eight or more plane sides.

BRIEF DESCRIPTION OF THE DRAWINGS

The above and other objects and advantages of a packing made in accordance with this invention will become more apparent upon consideration of the following detailed discussion when taken in association with the accompanying drawings, in which:

FIG. 1 is a perspective view of a first embodiment of a packing block of the present invention;

FIG. 2 is an elevational view of the packing block of FIG. 1;

FIG. 3 is a plan view of the packing block of FIGS. 1 and 2;

FIG. 4 is a perspective view of a second embodiment of the packing block of the invention;

FIG. 5 is an elevational view of the packing block of FIG. 5;

FIG. 6 is a plan view of the packing block of FIGS. 4 and 5; and

FIG. 7 is a fragmentary view in cross section of a packed tower filled with the packing blocks constructed according to the invention.

DETAILED DESCRIPTION OF THE PREFERRED EMBODIMENTS

Referring to the accompanying drawings, there is shown in FIGS. 1-3 a first embodiment of a packing material in the form of a packing block 1 of honeycomb structure. The packing block 1 includes partition walls 2 which define a multiplicity of parallel channels 3 formed in parallel to each other as fluid passages through the block. The packing block 1 is made of ceramic materials such as alumina, mullite, silica and cordierite. As most clearly illustrated in the elevational view of FIG. 2, the packing block 1 is a structure of generally planar hexagonal shape in elevation, having a depth of 40 mm, a width of 65 mm and a height of 25 mm. The partition walls 2 which have a thickness of 0.8 mm form the structure of the packing block 1 so that they define the thirteen parallel channels 3. Each channel 3 is a 9×9 mm square in cross section. These parallel channels 3 are open at their opposite ends in four sides or faces 4, 4, and 5, 5 (as viewed in FIG. 2), so that the line of extension of channels is inclined at about 40 degrees to the upper and lower plane sides 4, 4, but orthogonal or normal to the plane sides 5, 5 which extend from the left-side extremity of the upper plane side 4, and from the right-side extremity of the lower plane side 4, respectively. With respect to the parallel channels 3, therefore, the plane sides 4, 4 are referred to as "non-orthogonal" or "inclined faces" and the plane sides 5, 5 as "orthogonal faces". As shown in FIG. 2, the inclined faces 4, 4 have a greater surface area than the orthogonal faces 5, 5. Further, the packing block 1 has four other plane sides 6, 6 as viewed in FIG. 3 and 7, 7 as viewed in FIGS. 2 and 3. These plane sides 6, 6, 7, 7 are disposed in planes which include outer edges of the adjacent partition walls 2 on the front and rear, and left and right sides of the block 1, as most clearly depicted in FIG. 1, such that the plane sides 6, 7 are parallel to the line of extension of the parallel channels 3. Thus, the plane sides 6, 6, 7, 7 are referred to as "parallel faces". The parallel faces have a smaller surface area than the inclined faces 4, 4. As is apparent from the foregoing description, the packing block 1 is constructed as an octahedron.

Referring next to FIGS. 4-6, there is shown a second embodiment of a packing block 1. For simplification of the description, the same reference numerals as used in FIGS. 1-3 are applied to identify the corresponding parts. The packing block 1 of this second embodiment is generally viewed as an octadecahedron with 18-plane sides or faces, having a depth of 42 mm, a width of 42 mm and a height of 42 mm. This polyhedron comprises partition walls 2 of 0.8 mm thickness which define twelve parallel channels 3 each of which is a 9×9 mm square in cross section. These parallel channels 3 are open at their opposite ends in ten plane sides among the 18 plane sides of the block, which ten plane sides include eight non-orthogonal plane sides 4 which are inclined at about 35 degrees with respect to the line of extension of the parallel channels 3. The remaining two plane sides 5, 5 to which the channels 3 are open, are orthogonal to the line of extension of the channels 3. The eight plane sides 4, 4 have a greater surface area than the two plane sides 5, 5. The total 18 plane sides of the packing block 1 further include four plane sides 8 which are defined by the outer surfaces of the partition walls 2, and four more plane sides 9, 9 which are disposed in planes including the outer edges of the partition walls 2. These eight plane sides 8, 9 are parallel to the parallel channels 3 and have a smaller surface area than the inclined, non-orthogonal plane sides 4.

While the packing block 1 has been described in detail with a certain degree of particularity, the foregoing description will not be considered to limit the materials, configuration and dimensions of the block 1, thickness of the partition walls 2, angle of inclination of the inclined plane sides 4 relative to the line of extension of the parallel channels 3, etc. However, it is preferred that the block 1 be made of ceramic materials rather than glass, synthetic resin, metallic or other materials. Further, it is appreciated to provide the packing block with a plurality of inclined plane sides in which the channels 3 are open in an angled relation. To this end, the packing block 1 is constructed preferably as a polyhedron having not less than eight plane sides or faces each as viewed in elevation. In addition, it is a general requirement that the angle of inclination of the non-orthogonal plane sides with respect to the channels 3 be held within a range of about 30-60 degrees.

The packing block discussed above is obtained in the following manner. At first, a mass of alumina, cordierite or other ceramic clay is extruded through a die having a configuration corresponding to the specific shape of the channels which are to be formed in the block. The extruded mass is cut into bodies of desired dimensions, and the individual cut bodies are fired. Each of the fired bodies is then machined to obtain a packing block having the predetermined plane sides or faces as previously discussed. It is possible, however, that the extruded mass be cut into desired packing blocks. This method is preferable when the height of a packing block to be obtained is relatively larger than its length (width). In the case where the height is smaller than the length (width), the mass of the ceramic material may be effectively press-molded to desired shape before it is fired. In this latter case, the final shape of the packing block may be obtained through use of a press mold without having to perform any machining operation as required in the former case.

A large number of packing blocks 1 each constructed as described heretofore are dumped, i.e., placed in random, as illustrated in FIG. 7, in a tower 10 for processing fluids through contact therebetween, such that the tower is filled with these packing elements of honeycomb structure each having the multiple parallel channels 3 divided from each other by the partition walls 2. Since the channels 3 formed in each packing block 1 are open in at least one plane face of the block which is inclined with respect to the line of extension of the channels, a bed or layer (A) constructed of the multiple blocks 1 provides a complicated, three-dimensional continuous network of fluid passages consisting of the parallel channels 3 in the individual blocks 1, and voids formed between these blocks. This network of fluid passages produces turbulent flows of the fluids which result in increased effect of collision between streams of the fluids and forced deflection of the fluids during their upward and downward flows through the packed tower. As a result, the efficiency of gas-liquid contact and the distribution or uniformity of dispersion of the fluids are improved. It is also noted that the packing blocks 1 dumped into the tower 10 are oriented such that substantially all outer wall surfaces of the blocks are angled relative to the line of flow through the parallel channels 3. This angular arrangement assures uniform flows of the fluids through the channels 3 at any portions of the packing layer (A), without otherwise possible problem that the outer wall surfaces of the upper blocks 1 obstruct an upward flow of the fluid which has passed through the lower blocks 1. Accordingly, the pressure loss of the fluids is stabilized at a reduced level and the fluid dispersion characteristic is improved, whereby a uniform distribution of the fluids throughout the packed tower is obtained. Thus, the packing material of the invention has provided solutions to the drawbacks of the traditional packings of both stacked (regular) and dumped (irregular) arrangement types. A further advantage of the instant packing material is its ease of loading into the tower, that is, the tower may be filled with the instant packing materials without cumbersome and time-consuming stacking with orientation for establishing an intended regular arrangement as required on the traditional stacked packing materials.

As previously indicated, each of the inclined plane sides (faces) 4 is adapted to have a greater surface area than the other plane sides 5, 6, 7, 8 and 9. In this arrangement, the adjacently disposed packing blocks tend to be superposed with their inclined plane sides 4 acting as seats for each other even when the blocks 1 are dumped into the tower 10 in random. Consequently, there is provided an increased chance that the line of extension of the channels 3 is inclined with respect to the longitudinal direction of the tower 10, i.e., to the line of flow of the fluids through the tower 10. The superposition of the adjacent blocks with their inclined plane faces 4 held in abutting contact with each other as shown in FIG. 7, is advantageous because the openings of the channels 3 on the inclined plane face 4 of one block 1 are not entirely closed by the inclined plane face 4 of another block 1 in contact with said one block.

EXAMPLE

A multiplicity of the packing blocks of the previously discussed first embodiment of the invention were placed in two layers each 300 mm in depth (a total of 600 mm) in a fluid-contact column, and a stream of air containing 1000 ppm of ammonia ($NH_3$) is introduced into the packed column through the inlet at the bottom. Water was introduced at the top of the column at a rate of 6000 $kg/m^2/hr$. that the water flowing down the column contacts the up-flowing air in a countercurrent manner. Measurements were made of pressure loss and absorption efficiency of ammonia, and the obtained measurements were compared with the corresponding data obtained with known Raschig rings (each having an outside diameter of 25 mm and a height of 37 mm) which were placed in a similar fluid-contact column in the same manner as described above in connection with the present packing blocks. The results are listed in the table below:

TABLE

| | Experiment No. | Air Flow Rate (m/s) | Pressure Loss (mmAg/m) | Absorption Efficiency of Ammonia (%) |
|---|---|---|---|---|
| Instant | 1 | 1 | 20 | 95 |
| Packing | 2 | 2 | 75 | 90 |
| Known Porcelain | 3 | 1 | 55 | 88 |
| Raschig Ring | 4 | 2 | 250 | 84 |

The analysis of the above table reveals that the pressure loss of the instant packing is less than one third that of the known porcelain Raschig rings, and shows a 6-7 percent increase in efficiency of ammonia absorption of the instant packing over the Raschig rings.

It is accordingly considered that the packing material of the present invention has, to a considerable extent, alleviated the inconveniences experienced in the art, and thus owns a significant commercial value.

What is claimed is:

1. A packing material for filling a tower through which fluids to be processed flow in contact with each other, said packing material comprising:

a packing block having a honeycomb structure including partition walls defining a multiplicity of channels which are formed in a non-concentric parallel relationship with each other, thereby acting as fluid passages through the packing block, said packing block having at least eight planar sides and at least two of said at least eight planar sides are non-orthogonal with respect to a center line of said channels and at least two of said planar sides are orthogonal with respect to a center line of said channels and at least four of said planar sides are disposed in planes which include outer edges of adjacent partition walls, such that said at least four planar sides are parallel to center lines of said channels, wherein said at least two non-orthogonal sides have a surface area which is greater than a surface area of said at least two orthogonal sides and said at least four planar sides have a surface area which is less than said surface area of said non-orthogonal sides and at least one of said channels communicates a non-orthogonal side with another non-orthogonal side and another at least one of said channels comprises an orthogonal side with another orthogonal side.

2. The packing material of claim 1, wherein said at least two non-orthogonal sides of said packing block are inclined with respect to said center lines of said channels at an angle of 30–60 degrees.

3. The packing material of claim 1, wherein said packing block is an octahedron.

4. The packing material of claim 1, wherein said packing block is an octadecahedron including eight non-orthogonal sides and two orthogonal sides.

5. The packing material of claim 1, wherein said packing block consists of a ceramic material.

* * * * *